United States Patent [19]

Pruis et al.

[11] Patent Number: 5,256,921
[45] Date of Patent: Oct. 26, 1993

[54] GEAR MOTOR WITH ROTARY SWITCH

[76] Inventors: Harry Pruis, 13537 Garden Plane Rd., Morrison, Ill. 61270; Donald H. Hardey, 1103 Mary, Dixon, Ill. 61021

[21] Appl. No.: 892,778

[22] Filed: Jun. 3, 1992

[51] Int. Cl.⁵ .................... H02K 11/00; H02K 7/06; H02K 7/10
[52] U.S. Cl. .................................. 310/68 B; 310/83
[58] Field of Search ............... 310/39, 68 A, 68 B, 310/68 E, 99, 98, 83; 200/80 B

[56] References Cited

U.S. PATENT DOCUMENTS

| | | | |
|---|---|---|---|
| 4,092,575 | 5/1978 | Ogishi et al. | 318/282 |
| 4,754,362 | 6/1988 | Beller | 361/31 |
| 4,785,242 | 11/1988 | Vaidya et al. | 310/68 B |
| 4,996,544 | 2/1991 | Fiorda | 354/64 |

*Primary Examiner*—Steven L. Stephan
*Assistant Examiner*—E. To
*Attorney, Agent, or Firm*—Patnaude, Videbeck & Marsh

[57] ABSTRACT

A gear motor having an output shaft for driving the dispensing mechanism of a vending machine includes a plurality of magnetically operated switches positioned adjacent one end of the output shaft and a plurality of magnets attached to that end of the output shaft. A DC electric motor is energized by a computer to rotate the output shaft in a first direction until one of the magnetic switches is actuated by a magnet, which instructs the computer to reverse the polarity of power to the DC motor, reversing the direction of the motor and the output shaft. When the output shaft is returned to its standby position, one or more of the switches are again actuated which instructs the computer to terminate power to the DC motor. An enclosure surrounds the switches and magnets and protects them from the ambient.

16 Claims, 2 Drawing Sheets

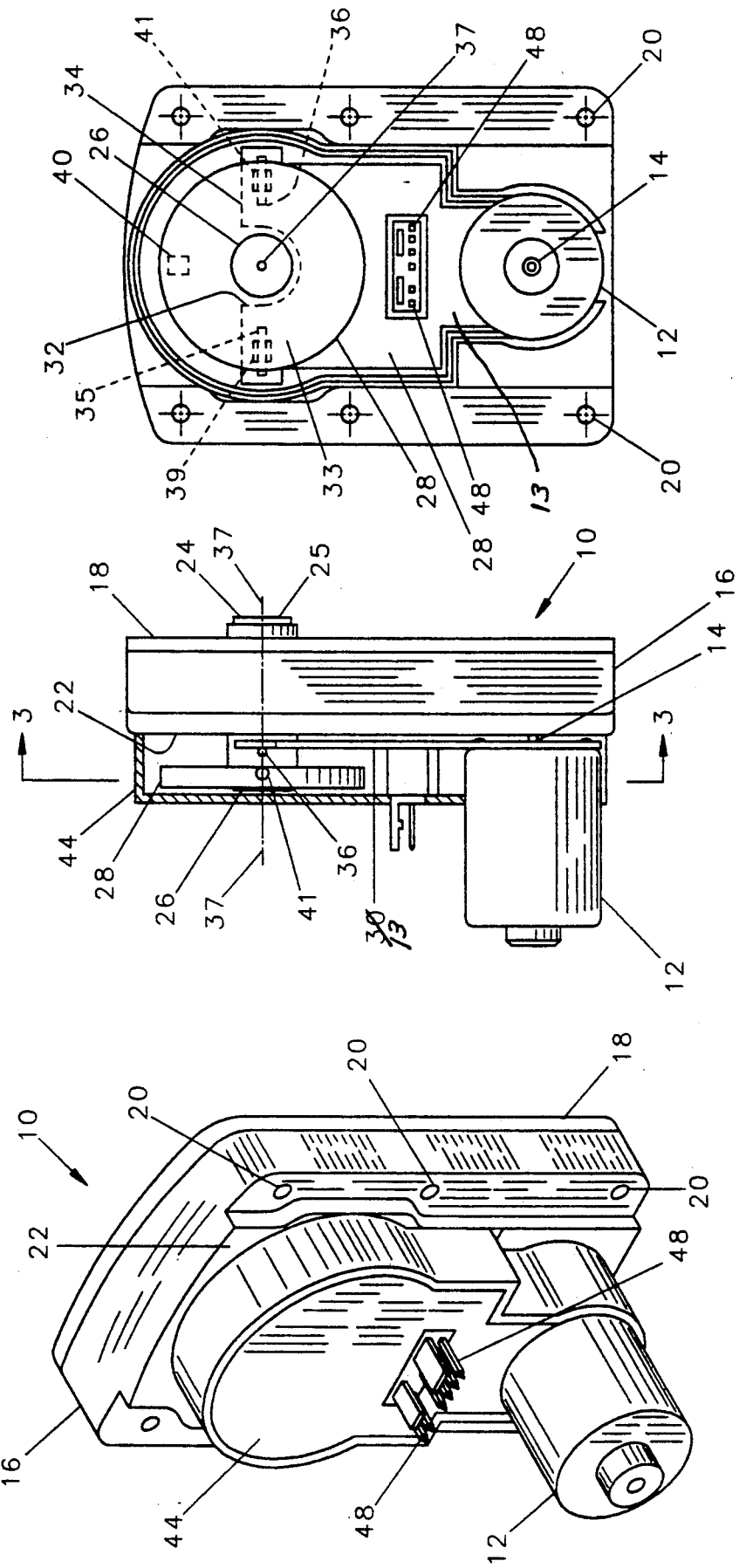

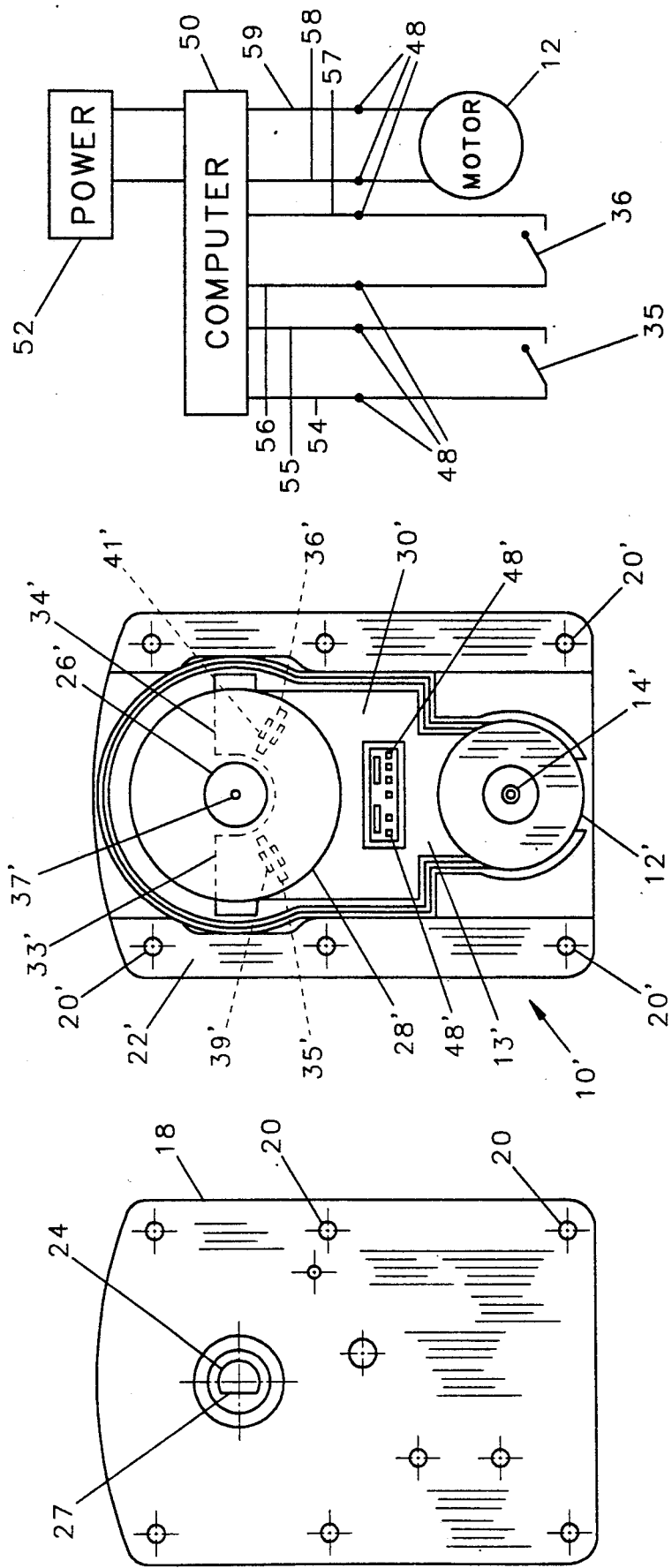

GEAR MOTOR WITH ROTARY SWITCH

The present invention relates in general to gear motors and associated switching mechanisms which control the operation of the motor, and it relates more particularly to a new and improved self-contained gear motor and switching assembly for use in a coin operated vending machine and which incorporates therein a switching mechanism for reversing the motor and returning it to its original standby position after the completion of a dispensing cycle of operation.

BACKGROUND OF THE INVENTION

Coin operated vending machines commonly include a coin acceptor, a plurality of manually operated selection switches, and a computer or logic board which responds to the operation of one of the selection switches to operate a dispensing mechanism which causes a selected item to move to a position from which the user may remove it from the machine.

Each such dispensing mechanism may include a gear motor which includes a reduction gear train which is driven by the shaft of an electric motor. The motor may be powered through one or more associated switches which are controlled either by the associated computer or by the output shaft of the reduction gear train to stop the operation of the motor when the output shaft of the gear reduction assembly has returned to its initial position.

Vending machines are frequently used in humid and dirty environments which interfere with the operation of the internal mechanisms of the machine such, for example, as the switches which control the operation of the dispensing motors.

SUMMARY OF THE INVENTION

Briefly, there is provided in accordance with the present invention a new and improved switching mechanism for controlling the operation of a gear motor. In the disclosed embodiment of the invention the gear motor is used to drive a dispensing mechanism incorporated in a vending machine wherein the drive system goes through one cycle of operation each time the motor is operated.

The switching mechanism is enclosed in a sealed housing which protects the switches from the ambient environment and includes two magnetically operated switches whose switching conditions are sensed by an associated computer to control the direction of rotation of the output shaft of the dispensing mechanism and to de-energize the motor when the output shaft has returned to its initial standby position.

Considered in greater detail, in a preferred embodiment of the invention three permanent magnets are carried by a disk which is mounted to the output shaft of a gear reduction unit driven by a reversible D.C. electric motor for selective angular movement into proximity with two magnetically operated switches. When any one of the magnets is moved into proximity with one of the two switches, the computer responds by reversing the polarity of the voltage applied to the motor causing it to rotate in the opposite direction until the disk returns to the original position wherein two of the magnets are in proximity with the two switches. When the two switches are simultaneously actuated, the computer responds by de-energizing the motor.

GENERAL DESCRIPTION OF THE DRAWINGS

The present invention will be better understood by a reading of the following detailed description taken in connection with the accompanying drawings wherein:

FIG. 1 is an isometric view of a gear motor and associated switching assembly embodying the present invention;

FIG. 2 is an elevational view of the assembly of FIG. 1 taken from the side thereof and shown partly in cross-section;

FIG. 3 is a cross-sectional front view of the motor and switching assembly shown in FIG. 2 and taken along the line 3—3 thereof;

FIG. 3A is a fragmentary front view of the circuit board shown partially in phantom lines in FIG. 3.

FIG. 4 is a rear elevational view of the motor and switching assembly shown in FIG. 1;

FIG. 5 is a partially sectioned front elevational view of a motor and switching assembly incorporating another embodiment of the invention; and FIG. 6 is a schematic circuit diagram of an electric motor control system using the switching mechanism of the present invention.

DETAILED DESCRIPTION OF PREFERRED EMBODIMENTS OF THE INVENTION

Referring to FIGS. 1-4, a gear motor unit 10 includes a reversible D.C. electric motor 12 mounted on a printed circuit board 13 and includes an output shaft 14 which drives a conventional gear reduction unit 16. The gear reduction unit 16 includes a plurality of intermeshed gears, not shown, located in a sealed housing having on one side an integral mounting plate 18 having a plurality of holes 20 which are adapted to receive suitable mounting bolts or screws. The board 13 is mounted to the face 22 of the gear reduction unit 16 located opposite to the plate 18. As best shown in FIG. 2, the gear reduction unit 16 has an output shaft 24 which extends from both faces of the unit 16, a first end portion 25 projecting through the mounting plate 18, and a second end portion 26 projecting through the face 22. In the preferred embodiment of the invention, the end portion 25 has a flat surface 27 which facilitates connection of the shaft 24 to a dispensing mechanism or other apparatus to be driven by the shaft 24.

As shown in FIG. 2, a planar carrier disk 28 which is formed of a rigid material, is fixedly mounted to the portion 26 of the shaft 24 outwardly of the circuit board 13. The board 13 and the disk 28 are mutually parallel with the planes thereof lying perpendicular to the axis of rotation of the shaft 24. In FIG. 3 the board 13 may be seen to have an arcuate opening 32 at the top through which the shaft 24 freely extends. The portions of the board 13 on either side of the opening 32 are referenced on the drawing as 33 and 34 and respectively carry magnetically actuated reed switches 35 and 36. The switches 35 and 36 are located one-hundred eighty degrees apart relative to the axis 37 of the shaft 24 and are equidistant from the central axis of the shaft 24.

Referring to FIG. 3A, adjacent each side of the switches 35, 36 are shunt wires 38a, 38b, 38c, 38d which may be of any suitable electrically conductive material such as nickel ferrite, and which extends parallel to the length of the adjacent switch 35, 36.

As may be seen in FIG. 3, three permanent magnets 39, 40, and 41 are mounted at angular positions of zero degrees, ninety degrees, and two hundred seventy degrees to the carrier disk 28 for selective movement into proximity with the switches 35 and 36 as the shaft 24 rotates. The magnets 39, 40 and 41 are equally spaced from axis 37 of the shaft 24 at the same radial distance as the switches 35 and 36 are spaced from the axis 37 of the shaft 24 so as to move into proximity with the switches 35 and 36 as the shaft 24 rotates. As shown, the magnets 39, 40, and 41 are embedded in the surface of the carrier disk 28.

The entire switching mechanism including the circuit board 13, and the carrier disk and magnets is enclosed by a dust-proof cover 44 which is affixed to the gear train housing over the face 22 thereof. A plurality of electric terminal connectors 48—48 extend from the circuit board on which they are mounted through complementary openings in the face of the cover 44. The terminals 48—48 are used to connect the unit 10 to a computer which supplies power to the motor 12 to drive it in one direction or the other in response to signals supplied to the computer via the terminals 48—48 from the switches 35 and 36 as is described in greater detail hereinafter.

Referring to FIG. 6, it will be seen that the switches 35 and 36 and the motor 12 are connected to a computer 50 through the terminals 48—48. A source of electric power 52 is used to power the computer. The motor 12 is a reversible DC motor and the power which is applied thereto by the computer 50 is, therefore, also DC. The polarity of the voltage from the computer to the motor 12 determines the direction of rotation of the motor.

OPERATION

In operation, the carrier disk 28 always returns to the illustrated standby position at the completion of a dispensing operation. Therefore, when a selection has been made and a vending cycle is initiated in any suitable manner to cause the computer to energize the motor 12, the motor shaft will rotate from the standby position in a predetermined direction to move the magnets away from the switches and thus causing the contacts in the switches 35 and 36 to move from their normal positions. As shown in FIG. 6, the switches 35 and 36 are normally open. However, the circuit can be designed to operate with normally closed switches.

The computer 50 senses that the switches 35 and 36 have opened and continues to supply power to the motor 12 until the magnet 40 moves into proximity with one of the switches 35 or 36.

The shunt wires 38 positioned adjacent each side of the reed switches 35, 36 suppress the flux field from the magnet such that the switches 35, 36 are not actuated until the magnet 40 is directly over one of the switches 35, 36.

When either one of these switches is thus actuated, the computer 50 reverses the polarity of the DC voltage applied to the motor 12 causing it to reverse the direction of rotation of the shaft 24. The motor 12 continues to rotate the shaft 24 in the reverse direction until the magnets 39 and 41 move into proximity with the switches 35 and 36 causing both switches to be actuated simultaneously, one of which is actuated for the second time during the cycle. The computer may be adapted to respond to either the simultaneous operation of both switches 35, 36 or to the second actuation of a single switch 35, 36. When the appropriate condition is sensed by the computer, it interrupts the supply of power to the motor 12 causing it to stop with the magnets 39 and 41 in proximity with the switches 35 and 36. The system is then in the standby condition ready for the next cycle of operation.

The unit 10 may be used to drive more than one dispensing device, and it may be used to drive the input of a dispensing or other device in either a clockwise or counter-clockwise direction.

Referring to FIG. 5, there is shown another gear motor and associated switching mechanism 10' wherein parts corresponding to like parts in the embodiment of FIGS. 1-4 are identified with the same numbers and a prime.

In the device 10' the switches 35' and 36' are positioned ninety degrees apart, and only two permanent magnets 39' and 41' are mounted to the carrier disk 28'. The magnets 39' and 41' are also mounted ninety degrees apart. When both switches are in the actuated condition, i.e., the two magnets 39' and 41' are in respective proximity thereto, the system is in the standby condition. When an operating cycle is initiated, the motor 12' is energized by the application of a DC voltage across the terminals thereof causing the magnets to move away from the two switches permitting them to drop out. When one or the other of the two switches is again actuated, the computer reverses the polarity of the voltage applied to the motor 12' causing the shaft thereof to rotate in the opposite direction until the magnets return to their respective positions in proximity to the switches 35' and 36' and causing the computer to deenergize the motor 12'. Shunt wires, not shown, as provided in the first embodiment, ensure that neither of the 35', 36' is actuated until a magnet is rotated to a position directly over the switch 35', 36'.

It may thus be seen that the present invention provides a novel switching system for driving a gear motor in either direction and for reversing the direction of rotation of the output shaft of the motor when the shaft has rotated through a predetermined angle and for automatically returning the motor to the original standby position.

While the present invention has been described in connection with a plurality of embodiments, it will be apparent to the those skilled in the art that many modifications and changes thereto may be made without departing from the true spirit and scope of the invention. Therefore, it is intended by the appended claims to cover all such changes and modifications which come within the true spirit and scope of the invention.

What is claimed:

1. The combination comprising:
   a reversible direct current electric motor,
   a reduction gear train in an enclosure having two opposing surfaces and an output shaft extending through one of said opposing surfaces, said shaft having a longitudinal axis, and said output shaft for conveying rotational power to a dispensing mechanism of a vending machine.
   said electric motor drivingly connected to said gear train,
   magnetically operated switch means fixedly positioned adjacent said output shaft, said switch means being radially spaced a given distant from said output shaft,
   carrier means mounted on said output shaft,
   at least one permanent magnet mounted to said carrier means and spaced from said output shaft a distance equal to the distance said switch means is radially spaced from said output shaft, means connected to said magnetically operated switch means for reversing the polarity of current applied to said electric motor on a first actuation of said switch means and to terminate current applied to said electric motor upon a second actuation of said switch means whereby said output shaft will be caused to rotate through a given angle, reverse and return to a standby position.

2. The combination comprising:

a reversible direct current electric motor, a reduction gear train in an enclosure having two opposing surfaces and an output shaft extending through one of said opposing surfaces, said shaft having a longitudinal axis, and said output shaft for conveying rotational power to a dispensing device of a vending machine.

said electric motor drivingly connected to said gear train, two magnetically operated switches fixedly positioned adjacent said output shaft, said switches being radially spaced a given distant from said output shaft and having a given angular spaced relationship relative to said axis of said output shaft, and said switches being in a plane substantially perpendicular to said axis of said output shaft, carrier means mounted on said output shaft, said carrier for retaining a plurality of permanent magnets in a plane perpendicular to said axis of said output shaft, a plurality of permanent magnets mounted to said carrier means and spaced from said output shaft a distance equal to said given distance said switches are radially spaced from said output shaft, two of said permanent magnets being angularly spaced relative to said axis of said output shaft equal to said given angular spaced relationship of said switches, and means connected to said magnetically operated switches to reverse the polarity of current applied to said electric motor when one of said switches is actuated and to terminate said current applied to said electric motor when both of said switches are actuated whereby said output shaft will be caused to rotate through said given angular space in either of two directions, reverse and return to standby position.

3. The combination of claim 2 further comprising a first magnet and a second magnet, said first and said second magnets mounted on said carrier means and spaced angularly around said output shaft at an angle equal to said angular spaced relationship of said switches, a third magnet angularly spaced midway between said first and said second magnet, and said motor in a stand-by position when said output shaft and said carrier are oriented with said first magnet adjacent one of said magnetically operated switches and said second magnet adjacent the other of said magnetic switches, whereby the polarity of DC current applied to said electric motor is reversed when said third magnet is rotated on said carrier to a position adjacent one of said magnetically operated switches.

4. The combination in accordance with claim 3 wherein said magnetically operated switches are angularly spaced about 180 degrees apart from each other, said first and said second permanent magnets are angularly spaced about 180 degrees apart from each other, and said third of said magnets is spaced about 90 degrees apart from each of said first and said second magnets.

5. The combination of claim 2 wherein two magnets are mounted on said carrier, and said motor is adapted to be in a stand-by position when said output shaft and said carrier are oriented with each of said magnets adjacent one of said magnetically operated switches.

6. The combination in accordance with claim 5 wherein said magnetically operated switches are angularly spaced about 90 degrees apart from each other and said permanent magnets are angularly spaced about 90 degrees apart from one another.

7. The combination in accordance with claim 1 and further comprising a computer, a source of DC electric power, and said computer controls the application of DC electric power to said electric motor whereby the polarity of said DC power applied to said electric motor is reversed by said computer upon a first actuation of said magnetically operated switch means and DC power applied to said electric motor is terminated upon a second actuation of said magnetically operated switch means.

8. The combination in accordance with claim 1 further comprising:

an enclosure surrounding said switches, said carrier, said magnets and a portion of said output shaft for sealing against the ambient.

9. The combination in accordance with claim 4 and further comprising:

an enclosure surrounding said switches, said carrier, said magnets, and a portion of said output shaft for sealing against the ambient.

10. The combination in accordance with claim 6 and further comprising:

an enclosure surrounding said switches, said carrier, said magnets, and a portion of said output shaft for sealing against the ambient.

11. The combination in claim 1 further comprising a shunt wire adjacent one side of each of said magnets.

12. The combination in claim 1 further comprising a shunt wire adjacent each side of each of said magnets.

13. The combination in claim 3 further comprising a shunt wire adjacent each side of each of said magnets.

14. The combination in claim 5 further comprising a shunt wire adjacent each side of each of said magnets.

15. The method of controlling a direct current motor and gear assembly having an output shaft comprising the steps of:

fixedly mounting a pair of magnetically operated switches a given angle apart around said output shaft and in a plane perpendicular to said output shaft, mounting first and second permanent magnets to said output shaft in a plane perpendicular to said axis of said shaft and separated by an angle equal to said given angle separating said pair of switches, providing a source of DC power, attaching said motor, said source of DC power, and said switches to a computer such that actuation of one of said switches will cause said computer to reverse the polarity of said DC power applied to said motor and actuation of both of said switches will cause said computer to terminate the application of said DC power to said motor thereby reversing said motor after said output shaft has rotated through said given angle and turning off said motor after said output shaft has returned to a standby position.

16. The method of claim 15 further comprising the steps of:

mounting a third permanent magnet angularly, midway between said first and second permanent magnets, such that said third permanent magnet will actuate one of said switches upon rotation of said output shaft through one half said given angle separating said magnetic switches, and thereby instruct said computer to reverse the polarity of said DC power applied to said motor.

* * * * *